United States Patent
Ishizawa et al.

(10) Patent No.: US 11,269,574 B2
(45) Date of Patent: Mar. 8, 2022

(54) IMAGE FORMING APPARATUS EXECUTES IMAGE FORMATION PROCESS USING SPOT AND PROCESS COLORS, WHEN HIGH QUALITY PRINTING FUNCTION IS SELECTED

(71) Applicant: SEIKO EPSON CORPORATION, Tokyo (JP)

(72) Inventors: Taku Ishizawa, Matsumoto (JP); Tadahiro Mizutani, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/183,757

(22) Filed: Feb. 24, 2021

(65) Prior Publication Data
US 2021/0263692 A1    Aug. 26, 2021

(30) Foreign Application Priority Data
Feb. 25, 2020   (JP) ................................ 2020-028975

(51) Int. Cl.
*G06F 3/12* (2006.01)
*B41J 2/21* (2006.01)
*B41J 29/393* (2006.01)
*G06K 15/00* (2006.01)

(52) U.S. Cl.
CPC .......... *G06F 3/1239* (2013.01); *B41J 2/2132* (2013.01); *B41J 29/393* (2013.01); *G06F 3/1203* (2013.01); *G06F 3/1238* (2013.01); *G06F 3/1208* (2013.01); *G06K 15/4015* (2013.01)

(58) Field of Classification Search
None
See application file for complete search history.

(56) References Cited

U.S. PATENT DOCUMENTS

| | | | | |
|---|---|---|---|---|
| 6,490,049 B1* | 12/2002 | Cunnagin | ............. | B41J 2/5056 358/1.13 |
| 2003/0063314 A1* | 4/2003 | Otsuki | ................ | B41J 13/0081 358/1.16 |
| 2007/0024874 A1* | 2/2007 | Kawamura | .......... | H04N 1/3935 358/1.2 |

(Continued)

FOREIGN PATENT DOCUMENTS

JP    2017-047590 A    3/2017

*Primary Examiner* — Haris Sabah
(74) *Attorney, Agent, or Firm* — Oliff PLC

(57) ABSTRACT

To provide a technique in which an image forming process is not restricted even when consumption information cannot be transmitted to the outside such as a server in an image forming apparatus. The image forming apparatus includes an operation control portion for executing a plurality of functions for forming an image; a memory that stores availability information of the plurality of functions according to a specified contract that defines usage conditions of the image forming apparatus; and a determination portion that determines, when a usage request for at least one of the plurality of functions is received, with reference to the availability information, whether or not the at least one of the plurality of functions corresponding to the usage request received is configured to be used, in which the operation control portion controls operation of the image forming apparatus in accordance with a determination result of the determination portion.

5 Claims, 5 Drawing Sheets

| CONTRACT PLAN | MONTHLY AMOUNT (JPY) | CONTRACT PERIOD (YEAR) | FUNCTION LIST (UPPER LIMIT USAGE FREQUENCY) | | |
|---|---|---|---|---|---|
| | | | MONOCHROME PRINTING FUNCTION | COLOR PRINTING FUNCTION | HIGH-QUALITY PRINTING FUNCTION |
| A | 100 | 1 | AVAILABLE (200 SHEETS) | UNAVAILABLE | UNAVAILABLE |
| B | 150 | 2 | AVAILABLE (400 SHEETS) | UNAVAILABLE | UNAVAILABLE |
| C | 200 | 1 | AVAILABLE (200 SHEETS) | AVAILABLE (200 SHEETS) | UNAVAILABLE |
| D | 250 | 2 | AVAILABLE (400 SHEETS) | AVAILABLE (400 SHEETS) | UNAVAILABLE |
| E | 400 | 1 | AVAILABLE (200 SHEETS) | AVAILABLE (200 SHEETS) | AVAILABLE (200 SHEETS) |
| F | 500 | 2 | AVAILABLE (400 SHEETS) | AVAILABLE (400 SHEETS) | AVAILABLE (400 SHEETS) |

(56) References Cited

U.S. PATENT DOCUMENTS

2007/0216930 A1* 9/2007 Jacobs ................. G06K 15/00
358/1.14
2018/0101336 A1* 4/2018 Onomatsu ............ G06F 3/1212

* cited by examiner

FIG. 2

| CONTRACT PLAN | MONTHLY AMOUNT (JPY) | CONTRACT PERIOD (YEAR) | FUNCTION LIST (UPPER LIMIT USAGE FREQUENCY) | | |
|---|---|---|---|---|---|
| | | | MONOCHROME PRINTING FUNCTION | COLOR PRINTING FUNCTION | HIGH-QUALITY PRINTING FUNCTION |
| A | 100 | 1 | AVAILABLE (200 SHEETS) | UNAVAILABLE | UNAVAILABLE |
| B | 150 | 2 | AVAILABLE (400 SHEETS) | UNAVAILABLE | UNAVAILABLE |
| C | 200 | 1 | AVAILABLE (200 SHEETS) | AVAILABLE (200 SHEETS) | UNAVAILABLE |
| D | 250 | 2 | AVAILABLE (400 SHEETS) | AVAILABLE (400 SHEETS) | UNAVAILABLE |
| E | 400 | 1 | AVAILABLE (200 SHEETS) | AVAILABLE (200 SHEETS) | AVAILABLE (200 SHEETS) |
| F | 500 | 2 | AVAILABLE (400 SHEETS) | AVAILABLE (400 SHEETS) | AVAILABLE (400 SHEETS) |

| FUNCTION LIST | AVAILABILITY |
|---|---|
| MONOCHROME PRINTING FUNCTION | AVAILABLE |
| COLOR PRINTING FUNCTION | AVAILABLE |
| HIGH-QUALITY PRINTING FUNCTION | UNAVAILABLE |

| IDENTIFIER | CONTRACT PLAN | MONTHLY AMOUNT (JPY) | FUNCTION LIST UPPER LIMIT (USAGE FREQUENCY) | AVAILABILITY | USAGE INFORMATION ||
| --- | --- | --- | --- | --- | --- | --- |
| | | | | | USAGE FREQUENCY (SHEETS) | USAGE EXPIRATION DATE |
| 001 | C | 200 | MONOCHROME PRINTING FUNCTION (200 SHEETS) | AVAILABLE | 210 | OO ΔΔ, XXXX |
| | | | COLOR PRINTING FUNCTION (200 SHEETS) | AVAILABLE | 50 | |
| | | | HIGH-QUALITY PRINTING FUNCTION (-) | UNAVAILABLE | - | |

92

IMAGE FORMING APPARATUS EXECUTES IMAGE FORMATION PROCESS USING SPOT AND PROCESS COLORS, WHEN HIGH QUALITY PRINTING FUNCTION IS SELECTED

The present application is based on, and claims priority from JP Application Serial Number 2020-028975, filed on Feb. 25, 2020, the disclosure of which is hereby incorporated by reference herein in its entirety.

BACKGROUND

1. Technical Field

The present disclosure relates to a technique for an image forming apparatus.

2. Related Art

In the related art, a printer that can use a normal cartridge, which is attached to the printer or commercially available at a retail store and a dedicated cartridge for flat-rate print processing is known (JP-A-2017-47590).

In the related art, when consumption information regarding a usage amount of consumed recording paper or a consumed recording material cannot be continuously transmitted with the dedicated cartridge installed, image formation processing using the dedicated cartridge is restricted. Therefore, the image formation processing is restricted when the consumption information cannot be transmitted externally, such as to a server. In addition, there is a demand for a technique enabling a printer to perform functions of the printer according to the contents of a contract without having to communicate externally.

SUMMARY

According to an aspect of the present disclosure, an image forming apparatus is provided. The image forming apparatus includes an operation control portion for executing a plurality of functions for forming an image, a memory that stores availability information of the plurality of functions according to a specified contract that defines usage conditions of the image forming apparatus, and a determination portion that determines, when a usage request for at least one of the plurality of functions is received, with reference to the availability information, whether or not the at least one of the plurality of functions corresponding to the usage request that is received is configured to be used, in which the operation control portion controls operation of the image forming apparatus according to a determination result of the determination portion.

BRIEF DESCRIPTION OF THE DRAWINGS

FIG. 2 is a diagram for explaining a specified contract.

FIG. 4 is a diagram for explaining availability information.

FIG. 5 is a diagram for explaining contract information.

DESCRIPTION OF EXEMPLARY EMBODIMENTS

A. Embodiment

Figure 1:
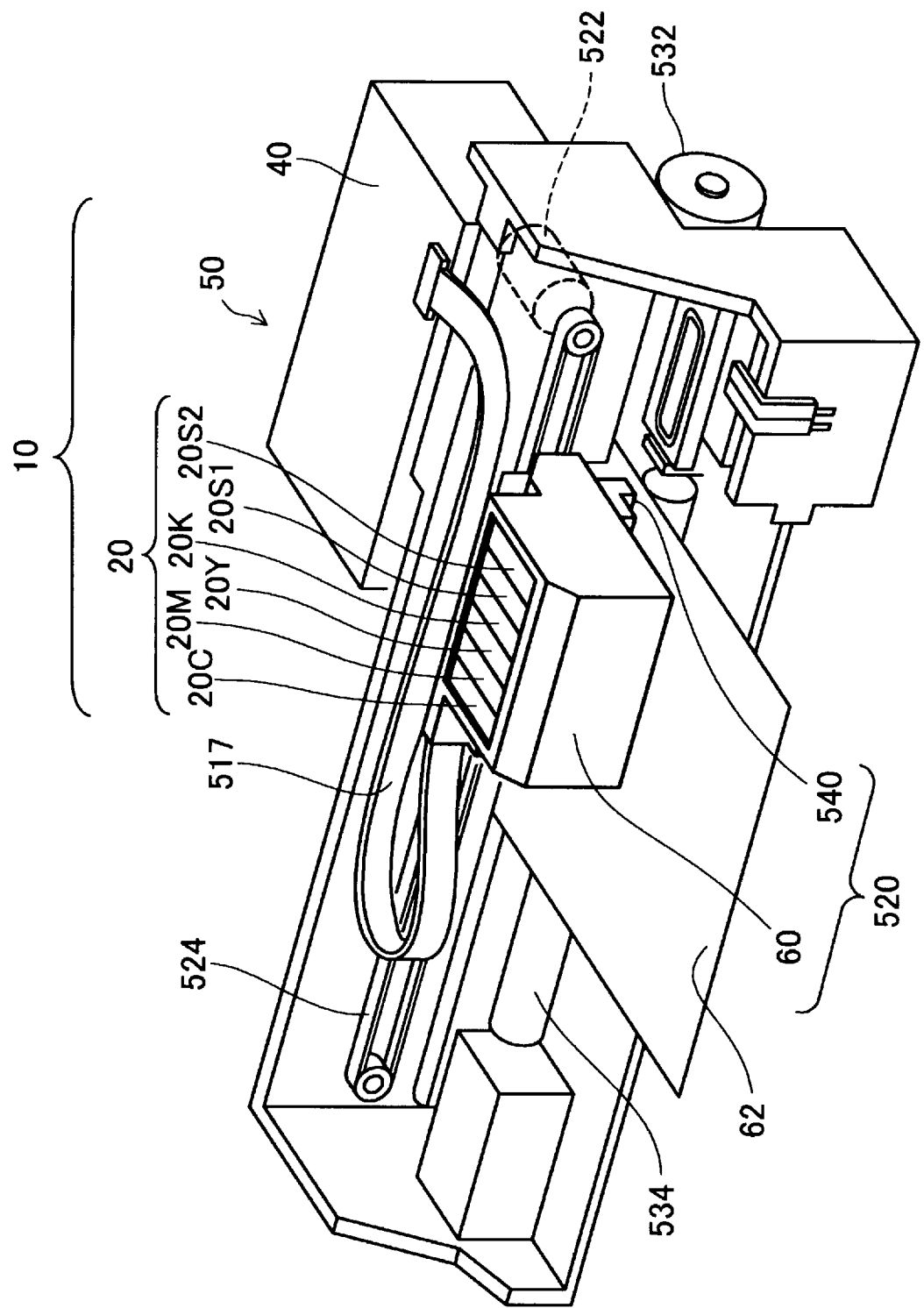
FIG. 1 is a perspective view of an image forming system according to an embodiment of the present disclosure.

FIG. 1 is a perspective view of an image forming system 10 according to an embodiment of the present disclosure. The image forming system 10 includes a cartridge 20 as consumables and a printer 50 as an image forming apparatus.

The printer 50 is an ink jet printer that forms images such as characters or figures on a print medium 62 by ejecting ink of the cartridge 20 from a print head 540 onto the print medium 62. The printer 50 includes a control device 40 and a carriage unit 520. The carriage unit 520 includes the print head 540 and a holder 60. The cartridge 20 is detachably attached to the holder 60 by a user. Note that the cartridge 20 is also referred to as a "cartridge".

The control device 40 of the printer 50 controls each portion of the printer 50. The carriage unit 520 is configured so that the print head 540 can be moved relative to the print medium 62. The control device 40 and the carriage unit 520 are electrically coupled via a flexible cable 517. The print head 540 operates based on a control signal from the control device 40 and ejects the ink onto the print medium 62, such as paper or a label. As a result, the image is printed and formed on the print medium 62.

A printer in which the cartridge 20 is attached onto the holder 60 of the carriage unit 520, such as the printer 50 of the present embodiment, is also called an "on-carriage type". In another embodiment, an immovable stationary holder is installed in a portion different from that of the carriage unit 520, and ink from an ink cartridge attached onto the holder may be supplied to the print head 540 of the carriage unit 520 via a flexible tube. Such a printer type is also referred to as an "off-carriage type".

The printer 50 includes a main scanning feed mechanism and a sub-scanning feed mechanism for relatively moving the carriage unit 520 and the print medium 62. The main scanning feed mechanism includes, for example, a carriage motor 522 and a drive belt 524 and reciprocates the carriage unit 520 in a main scanning direction by transferring power of the carriage motor 522 to the carriage unit 520 via the drive belt 524. The sub-scanning feed mechanism includes, for example, a transport motor 532 and a platen 534 and transports the print medium 62 in a sub-scanning direction orthogonal to the main scanning direction by transferring power of the transport motor 532 to the platen 534. The carriage motor 522 of the main scanning feed mechanism and the transport motor 532 of the sub-scanning feed mechanism operate based on a control signal from the control device 40.

The cartridge 20 accumulates ink as a printing material. The ink accumulated in the cartridge 20 is supplied to the print head 540. A plurality of cartridges 20 are detachably attached onto the holder 60. In the present embodiment, six types of cartridges 20 corresponding to six types of inks of process color inks of black ink, magenta ink, cyan ink, and yellow ink, which are basic inks for image formation, and two spot color inks, which are different from the process color inks, are individually attached onto the holder 60. Examples of the spot color inks used in the present embodiment include blue ink, violet ink, and special glossy inks such as metallic ink. The cartridge 20 accumulating black ink is also referred to as a cartridge 20K, the cartridge 20 accumulating magenta ink is also referred to as a cartridge 20M, the cartridge accumulating yellow ink is also referred to as a cartridge 20Y, and the cartridge accumulating cyan ink is also referred to as a cartridge 20C. In addition, the cartridge 20 accumulating one type of spot color ink is also referred to as a cartridge 20S1, and the cartridge 20 accumulating another type of spot color ink is also referred to as a cartridge 20S2. When the ink of the cartridge 20 is depleted, a new cartridge 20 is attached onto the holder 60. Note that the number of cartridges 20 that are attachable onto the holder 60 and the type of ink can be arbitrarily set.

The printer 50 can execute a plurality of functions for forming the image on the print medium 62. The plurality of functions include a monochrome printing function, a color printing function, and a high-quality printing function. The monochrome printing function, which will be described later, is a function of forming an image on the print medium 62 by printing using only black ink. The color printing function is a function of forming an image on the print medium 62 by printing using the process color inks of black ink, cyan ink, magenta ink, and yellow ink. The high-quality printing function is a function of forming an image on the print medium 62 by printing using the process color inks and the spot color inks.

FIG. 2 is a diagram for explaining a specified contract that the user makes with a third party such as a manufacturer that supplies the printer 50 regarding the use of the printer 50. The specified contract defines the usage conditions of the printer 50 as the image forming apparatus. A plurality of types of contract plans A to F are prepared for the specified contract. The user makes a contract including any of the contract plans A to F with the third party before using the printer 50, such as when purchasing the printer 50. The contract plans A to F include a monthly usage fee, a contract period, available functions of the printer 50, and an upper limit usage frequency that indicates an upper limit usage frequency for each function. The upper limit usage frequency is the number of printed sheets of the print medium 62 or the amount of ink consumed. In the present embodiment, the upper limit usage frequency is defined by the number of printed sheets indicating the upper limit that can be printed per month.

The contract plans A to F have different contract contents. For example, in the contract plan A, only the monochrome printing function may be used, while, in the contract plan C, the monochrome printing function and the color printing function may be used. In addition, for example, in the contract plan C, the upper limit number of printed sheets per month is 200 for each available function, while in the contract plan D, the upper limit number of printed sheets is 400.

Figure 3:
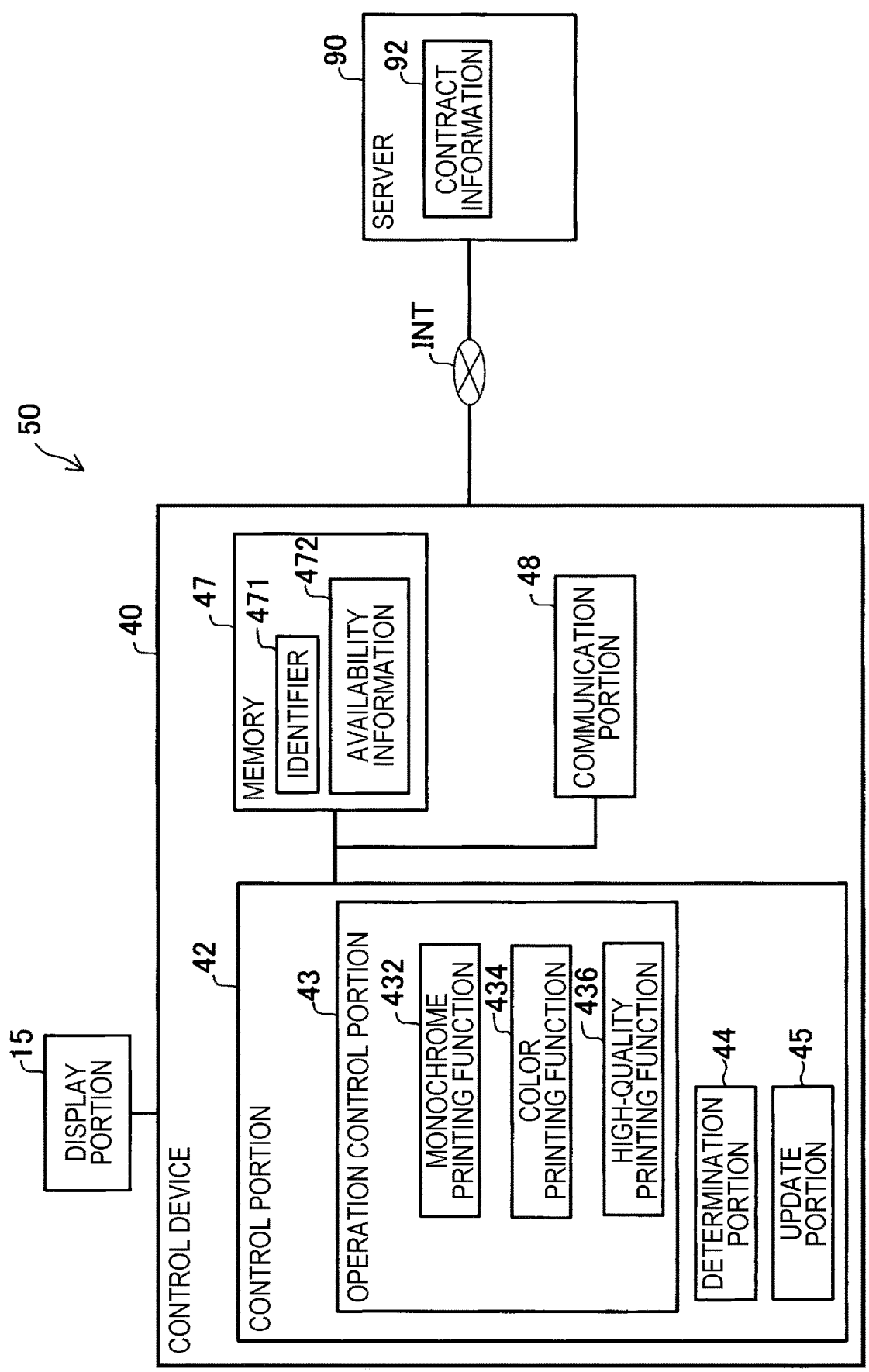
FIG. 3 is a diagram mainly for explaining a printer.

FIG. 3 is a diagram mainly for explaining the printer 50. FIG. 4 is a diagram for explaining availability information 472. FIG. 5 is a diagram for explaining contract information 92.

As illustrated in FIG. 3, the printer 50 or other printers can perform data communication with a server 90 via an Internet INT. The other printers have the same configuration as the printer 50.

The server 90 stores contract information 92 contracted by the user who uses the printer 50. As illustrated in FIG. 5, the contract information 92 defines the contents of the contracted specified contract for each printer 50 and the other printers. Specifically, the contract information includes identifier information assigned to the printer 50 or the other printers, contract plan information, monthly amount information, function availability information, current usage frequency information, which is one piece of the usage information, and expiration date information, which is another piece of the usage information. The usage frequency information represents the usage frequency, and, specifically, is information on the number of printed print media 62. The usage frequency information is reset on a monthly basis, such as at the end of each month. The usage frequency information is updated by adding information indicating the number of printed sheets transmitted from the printer 50 at a predetermined timing. The predetermined timing is the end of the printing operation or at a predetermined time. The expiration date information is an expiration date of the contract plan, that is, an indication of the expiration date of the available function. As described above, the usage information includes the usage frequency information indicating the usage frequency of the plurality of functions of the printer 50 and the expiration date information of the plurality of functions.

As illustrated in FIG. 3, the printer 50 includes the above-described control device 40 and a display portion 15. The display portion 15 is used to notify the user of various types of information, and is, for example, a liquid crystal monitor. The control device 40 includes a control portion 42, a memory 47, and a communication portion 48.

The memory 47 includes a rewritable non-volatile storage device and stores various programs to be executed by the control portion 42, an identifier 471, and the availability information 472. The identifier 471 is unique information for specifying the printer 50, and is assigned at the time of manufacture, for example. As illustrated in FIG. 4, the availability information 472 is information indicating the availability of the plurality of functions according to a specified contract that defines the usage conditions of the printer 50. Specifically, the availability information 472 is information indicating the availability of each function of the printer 50. Since the user of the printer 50 has made the contract plan C, the availability information 472 that sets the monochrome printing function as "available", the color printing function as "available", and the high-quality printing function as "unavailable" according to the contract plan C is stored in the memory 47. The availability information 472 may be stored in the memory 47 via a terminal such as a personal computer coupled to the printer 50 when the user makes the contract. In addition, the availability information 472 may be stored in the memory 47 by the control portion 42 by receiving the contract information 92 from the server 90 when being stored in the server 90 as the contract information 92.

The control portion 42 functions as an operation control portion 43, a determination portion 44, and an update portion 45 by executing various programs stored in the memory 47. The operation control portion 43 controls printing operation of the printer 50. The operation control portion 43 controls the printing operation by using any of a monochrome printing function 432, a color printing function 434, and a high-quality printing function 436. When the determination portion 44 receives a usage request for a plurality of functions, which is at least one of the three functions in the present embodiment, the determination portion 44 determines whether or not the function corresponding to the received usage request is available with reference to the availability information 472. The usage request is included in a print instruction from the user. For example, when the user instructs the printer 50 to print in monochrome via the terminal such as the personal computer coupled to the printer 50, the function corresponding to the usage request is the monochrome printing function 432.

The operation control portion 43 controls the operation of the printer 50 according to a determination result of the determination portion 44. In the present embodiment, when the determination portion 44 determines that the function corresponding to the usage request is available, the operation control portion 43 executes the image formation by printing using the function corresponding to the usage request. On the other hand, when the determination portion 44 determines that the function corresponding to the usage request is unavailable, the operation control portion 43 executes the image formation by printing using the available function. For example, in a first case where the operation control portion 43 receives the usage request for the high-quality printing function, when the determination portion 44 determines that the high-quality printing function is available with reference to the availability information 472, the image formation is executed by printing using the process color ink and the spot color ink. As a result, it is possible to perform high-quality printing in contrast to normal printing using only the process color ink. On the other hand, in the first case, when the determination portion determines that the high-quality printing function cannot be used with reference to the availability information 472, the image formation is executed by printing using the process color ink, which is the available function.

When the determination portion 44 determines that the function corresponding to the usage request cannot be used, the operation control portion 43 may display a message indicating that the function of the usage request is unavailable and a name of the available function on the display portion 15 without executing the printing. For example, when the usage request is printing using the high-quality printing function 436, the determination portion 44 determines that the high-quality printing function is unavailable by referring to the availability information 472 illustrated in FIG. 4. In this case, the operation control portion 43 displays a message that the high-quality printing function 436 cannot be used, and the monochrome printing function and the color printing function that are available functions, on the display portion 15.

In addition, when the determination portion 44 determines that the function corresponding to the usage request cannot be used, the display portion 15 may display, by the instruction from the operation control portion 43, a message prompting contract of a specified contract in which the function corresponding to the received usage request is available. For example, the display portion 15 displays a message that "A contract for the contract plan E or the contract plan F in which the high-quality printing function is available is recommended". By doing so, the user can be prompted to contract a contract plan of an appropriate specified contract in which a function desired by the user is available.

The update portion 45 illustrated in FIG. 3 acquires the usage information included in the contract information 92 from the server 90 via the communication portion 48 and updates the availability information 472 stored in the memory 47 by using the acquired usage information. The update portion 45 acquires the usage information on a regular basis, for example, at a predetermined timing. For example, when the content indicated by the acquired usage information differ from the content of the specified contract, the update portion 45 updates the availability information 472 so that the differing function cannot be used. Specifically, as illustrated in FIG. 5, the usage frequency of the monochrome printing function of the acquired usage information is 210 sheets, and differs from the content of the contract plan C, that is, the upper limit usage frequency per month of 200 sheets. In this case, the update portion 45 updates a status of the monochrome print function of the availability information 472 illustrated in FIG. 4 from available to unavailable. In addition, for example, when the expiration date, which is one piece of the usage information, differs from the current time, that is, is later than the current time, the update portion 45 updates the status of all of the available functions of the availability information 472 from available to unavailable. Note that when the update portion 45 updates the availability information 472 due to the usage frequency, the update portion 45 returns the availability information 472 to reset the contents on the first day of every month. That is, when the status of the monochrome printing function is unavailable, the update portion 45 returns the status of the monochrome printing function to available according to the contents of the contract plan C. In this way, the availability information 472 is easily updated by the update portion 45 by using at least one piece of the usage information, for example, the usage frequency and the usage expiration date.

In addition, when the specified contract of the printer 50 is changed, the update portion 45 updates the availability information 472 with the contents corresponding to the changed specified contract. For example, when the user changes the contract plan, the contract information 92 of the server 90 is updated. When the contract information 92 is updated, the updated contract information 92 is transmitted from the server 90 to a target printer 50. The update portion 45 acquires the updated contract information 92 from the server 90 and updates the availability information 472. For example, when the user changes from the contract plan C illustrated in FIG. 2 to the contract plan E, the status of the high-quality printing function in the availability information 472 illustrated in FIG. 4 is changed from unavailable to available by acquiring the updated contract information 92.

According to the embodiment, as illustrated in FIGS. 3 and 4, since the memory 47 stores the availability information 472, the determination portion 44 can determine whether or not the function corresponding to the usage request is available with reference to the availability information 472 according to the specified contract even when the printer 50 is not connected to a network, and the function corresponding to the determination result can be executed. As a result, even when the information cannot be externally transmitted, the function of the printer 50 according to the specified contract can be executed. In addition, since the availability information 472 is the information according to the specified contract, the function of the printer 50 according to the specified contract can be executed without external communication by determining the function that can be executed with reference to the availability information 472 of the memory 47. In addition, according to the embodiment, since the availability information 472 is stored in the memory 47, even when the content of the specified contract is changed, the availability information 472 may be rewritten without replacing the printer 50.

B. Other Embodiments

B-1. First Other Embodiment

In the above embodiment, the image forming apparatus is the printer 50, but is not limited thereto, and a multifunction peripheral having other functions in addition to the printing function may be used. In addition, in the above embodiment, the plurality of functions of the image forming apparatus 50 include the monochrome printing function, the color printing function, and the high-quality printing function, but may have other functions. Other functions can include the following examples. In addition, the contract plan of the specified contract may have contents that enable at least one of the functions listed below.

(1) Double-sided printing function that prints on both sides of the print medium 62
(2) When the image forming apparatus 50 has a memory card slot, a function of directly printing information stored in a memory card
(3) Wireless LAN coupling function
(4) Finisher function for collecting the print media 62 by staples or the like
(5) Scanner function
(6) Copy function
(7) Facsimile function
(8) Answering machine function
(9) Function of editing an image to be printed
(10) Function of externally acquiring an illustration to be pasted on a photographic image via the Internet INT or the like
(11) Automatic character recognition function
(12) Automatic translation function
(13) Function of storing data in an image forming apparatus or an external server
(14) Function of operating the image forming apparatus by voice B-2. Second Other Embodiment In the above embodiment, the availability information 472 may include the expiration date information illustrated in FIG. 5. By doing so, it is not necessary to acquire the expiration date information from the server 90 and update the availability information 472.

B-3. Third Other Embodiment

In each of the above embodiments, the printer 50 was capable of performing the printing using the spot color ink, but may be capable of performing the printing using other inks instead of or in addition to using the spot color ink. For example, the printer 50 may be capable of performing printing using light color ink having a density, for example, a pigment density, lower than that of the process color ink.

B-4. Fourth Other Embodiment

In the above embodiment, as illustrated in FIG. 2, the specified contract has the contract plans A to F, but may have other contract plans. For example, the specified contract may have a contract plan in which at least one of the plurality of functions described in the first embodiment is available.

C. Other Aspects

The present disclosure is not limited to the above-described embodiments, and can be realized in various forms without departing from the spirit of the present disclosure. For example, the present disclosure can also be realized in the following aspects. The technical features in each of the aspects described below correspond to the technical features in the above embodiments can be replaced or combined as appropriate to solve some or all of the problems of the present disclosure, or achieve some or all of the effects of the present disclosure. In addition, if the technical feature is not described as essential in the present specification, it can be appropriately deleted.

(1) According to one aspect of the present disclosure, an image forming apparatus is provided. The image forming apparatus includes an operation control portion for executing a plurality of functions for forming an image, a memory that stores availability information of the plurality of functions according to a specified contract that defines usage conditions of the image forming apparatus, and a determination portion that determines, when a usage request for at least one of the plurality of functions is received, with reference to the availability information, whether or not the at least one of the plurality of functions corresponding to the usage request that is received is configured to be used, in which the operation control portion controls operation of the image forming apparatus according to a determination result of the determination portion.

According to such an aspect, since the memory stores the availability information, the determination portion can determine whether or not the function corresponding to the usage request is available with reference to the availability information according to the specified contract even if the image forming apparatus is not connected to the network, and execute the function corresponding to the determination result. As a result, the function of the image forming apparatus can be executed even when the information cannot be transmitted externally. In addition, since the availability information is the information according to the specified contract, the function of the image forming apparatus according to the specified contract can be executed without communicating with the external factors by determining the function that can be executed with reference to the availability information of the memory.

(2) In the above aspect, the plurality of functions may include the monochrome printing function and the color printing function.

According to such an aspect, it is possible to execute the monochrome printing function or the color printing function according to the contents of the specified contract.

(3) In the above aspect, the image forming apparatus is configured to use the process color ink and the spot color ink different from the process color ink, the plurality of functions includes the high-quality printing function, in a case in which the usage request for the high-quality printing function is received, when the determination portion determines that the high-quality printing function is configured to be used, the operation control portion may execute the image formation by printing using the process color ink and the spot color ink, and when the determination portion determines that the high-quality printing function is not configured to be used, the operation control portion may execute the image formation by printing using the process color ink.

According to such an aspect, if the user makes a specified contract in which the high-quality printing function can be used, high-quality printing can be executed.

(4) In the above aspect, the image forming apparatus may further include an update portion that acquires usage information of the image forming apparatus, the usage information being information regarding the specified contract, and updates the availability information stored in the memory by using the usage information that is acquired.

According to such an aspect, the availability information is easily updated by the update portion by using the usage information.

(5) In the above aspect, the usage information may include at least one of usage frequency information indicating a usage frequency of the plurality of functions of the image forming apparatus and expiration date information of the plurality of functions.

According to such an aspect, the availability information is easily updated using at least one of the usage frequency and the expiration date.

(6) In the above aspect, the image forming apparatus may further include a display portion that displays, when the determination portion determines that the at least one of the plurality of functions corresponding to the usage request that is received is not configured to be used, a message prompting contract of the specified contract in which the function corresponding to the usage request that is received is configured to be used.

According to such an aspect, the display portion displays the message prompting contract of the specified contract, so that the user can be prompted to contract an appropriate specified contract in which the function desired by the user can be used.

In addition to the above-described image forming apparatus, the present disclosure can be realized in the form of an image forming system, a control method of the image forming apparatus, a computer program for executing the control method, a recording medium for recording the computer program, and the like.

What is claimed is:

1. An image forming apparatus comprising:
   an operation control portion for executing a plurality of functions for forming an image;
   a memory that stores availability information of the plurality of functions according to a specified contract that defines usage conditions of the image forming apparatus; and
   a determination portion that determines, when a usage request for at least one of the plurality of functions is received, with reference to the availability information, whether or not the at least one of the plurality of functions corresponding to the usage request that is received is configured to be used, wherein
   the operation control portion controls operation of the image forming apparatus in accordance with a determination result of the determination portion,
   the image forming apparatus is configured to use a process color ink and a spot color ink different from the process color ink,
   the plurality of functions include a high-quality printing function, and
   in a case in which the usage request for the high-quality printing function is received,
      when the determination portion determines that the high-quality printing function is configured to be used, the operation control portion executes image formation by printing using the process color ink and the spot color ink, and
      when the determination portion determines that the high-quality printing function is not configured to be used, the operation control portion executes the image formation by printing using the process color ink.

2. The image forming apparatus according to claim 1, wherein
   the plurality of functions include a monochrome printing function and a color printing function.

3. The image forming apparatus according to claim 1, further comprising:
   an update portion that acquires usage information of the image forming apparatus, the usage information being information regarding the specified contract and updates the availability information stored in the memory by using the usage information that is acquired.

4. The image forming apparatus according to claim 3, wherein
   the usage information includes at least one of usage frequency information indicating a usage frequency of the plurality of functions of the image forming apparatus and expiration date information of the plurality of functions.

5. The image forming apparatus according to claim 1, further comprising:
   a display portion that displays, when the determination portion determines that the at least one of the plurality of functions corresponding to the usage request that is received is not configured to be used, a message prompting contract of the specified contract in which the function corresponding to the usage request that is received is configured to be used.

* * * * *